US012671901B2

(12) United States Patent
Kim et al.

(10) Patent No.: US 12,671,901 B2
(45) Date of Patent: Jun. 30, 2026

(54) CAMERA MODULE HAVING DRIVING DRIVER AND SENSOR UNITS FOR LENS MOVEMENT

(71) Applicant: LG INNOTEK CO., LTD., Seoul (KR)

(72) Inventors: Min Kim, Seoul (KR); Young Seop Moon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 106 days.

(21) Appl. No.: 18/293,477

(22) PCT Filed: Aug. 8, 2022

(86) PCT No.: PCT/KR2022/011764
§ 371 (c)(1),
(2) Date: Jan. 30, 2024

(87) PCT Pub. No.: WO2023/018141
PCT Pub. Date: Feb. 16, 2023

(65) Prior Publication Data
US 2024/0340536 A1     Oct. 10, 2024

(30) Foreign Application Priority Data

Aug. 9, 2021    (KR) ........................ 10-2021-0104662

(51) Int. Cl.
*H04N 23/68*      (2023.01)
*H04N 23/55*      (2023.01)

(52) U.S. Cl.
CPC ........... *H04N 23/687* (2023.01); *H04N 23/55* (2023.01)

(58) Field of Classification Search
CPC ...... H04N 23/687; H04N 23/55; H04N 23/54; H04N 23/57; H04N 23/00; H04N 23/60; H04N 23/681; G03B 2205/0007
See application file for complete search history.

(56) References Cited

U.S. PATENT DOCUMENTS

2015/0261067 A1*   9/2015   Jung ..................... G02B 27/646
                                             348/208.1
2016/0295099 A1* 10/2016   Kasamatsu .......... H04N 23/673
(Continued)

FOREIGN PATENT DOCUMENTS

JP       2016-224262      12/2016
KR    10-2018-0137277     12/2018
(Continued)

OTHER PUBLICATIONS

International Search Report dated Nov. 10, 2022 issued in Application No. PCT/KR2022/011764.

*Primary Examiner* — Padma Haliyur
(74) *Attorney, Agent, or Firm* — KED & ASSOCIATES, LLP

(57) ABSTRACT
A camera module according to an embodiment of the present invention comprises: a magnet disposed in a mover for moving at least one lens; a first sensor unit for sensing the position of the magnet in correspondence to a first region in a moving region of the mover; a second sensor unit for sensing the position of the magnet in correspondence to a second region in the moving region of the mover; and a driving driver for receiving a first sensing signal of the first sensor unit and a second sensing signal of the second sensor unit, wherein the first sensor unit and the second sensor unit are connected in parallel to the driving driver.

20 Claims, 14 Drawing Sheets

(56)     References Cited

U.S. PATENT DOCUMENTS

| 2018/0321459 | A1* | 11/2018 | Kim | G02B 27/646 |
| 2018/0364450 | A1* | 12/2018 | Lee | H04N 23/55 |
| 2020/0348479 | A1* | 11/2020 | Kwon | G03B 17/12 |
| 2021/0072495 | A1* | 3/2021 | Shin | G02B 13/009 |
| 2021/0208363 | A1* | 7/2021 | Kuo | H02K 41/0356 |
| 2021/0215905 | A1* | 7/2021 | Kim | G01D 5/145 |
| 2021/0333567 | A1* | 10/2021 | Jeong | G03B 30/00 |
| 2021/0377447 | A1* | 12/2021 | Jeong | G03B 3/10 |
| 2022/0272237 | A1* | 8/2022 | Rho | H04N 23/51 |

FOREIGN PATENT DOCUMENTS

| KR | 10-2019-0129432 | | 11/2019 | |
| KR | 20200039378 | A * | 4/2020 | G02B 27/64 |
| KR | 10-2020-0122166 | | 10/2020 | |
| KR | 10-2021-0030724 | | 3/2021 | |

* cited by examiner

1200

⋅–⋅–⋅ S1

– ⋅ ⋅ – S2

——— Sf

CAMERA MODULE HAVING DRIVING DRIVER AND SENSOR UNITS FOR LENS MOVEMENT

CROSS-REFERENCE TO RELATED PATENT APPLICATIONS

This application is a U.S. National Stage Application under 35 U.S.C. § 371 of PCT Application No. PCT/KR2022/011764, filed Aug. 8, 2022, which claims priority to Korean Patent Application No. 10-2021-0104662, filed Aug. 9, 2021, whose entire disclosures are hereby incorporated by reference.

TECHNICAL FIELD

Embodiments relate to a camera module.

BACKGROUND ART

A camera is a device for taking pictures or videos by capturing images of subjects and is mounted on mobile devices, drones, vehicles, or the like. In order to improve the quality of the image, a camera module may have an image stabilization (IS) function for correcting or preventing the image shake caused by the movement of a user, an auto focusing (AF) function for aligning a focal length of a lens by automatically adjusting an interval between an image sensor and the lens, and a zooming function for capturing a remote subject by increasing or decreasing the magnification of an image of the remote subject through a zoom lens.

In order for a camera to accurately implement the optical image stabilizer (OIS) function, the AF function, and the zooming function, it is necessary to accurately sense a position of the lens. To this end, the camera is provided with a device for position sensing, and a Hall sensor is provided representatively.

The Hall sensor may detect a magnetic force of a magnet and sense a position of a mover coupled to the magnet, and since the mover accommodates a lens, the position of the lens may be estimated through the position of the mover.

However, when a moving distance of the mover increases (i.e., during a long stroke), the Hall sensor has a problem in that a sensing sensitivity weakens, making it difficult to measure an accurate position of the mover.

DISCLOSURE

Technical Problem

Embodiments are directed to providing a camera module having a high sensing sensitivity even during a long stroke.

The object of embodiments is not limited thereto and may also include objects or effects that may be identified from the configurations or embodiments to be described below.

Technical Solution

A camera module according to an embodiment of the present invention includes a magnet disposed on a mover configured to move at least one lens, a first sensor unit configured to sense a position of the magnet corresponding to a first region among moving regions of the mover, a second sensor unit configured to sense a position of the magnet corresponding to a second region among the moving regions of the mover, and a driving driver configured to receive a first sensing signal of the first sensor unit and a second sensing signal of the second sensor unit, wherein the first sensor unit and the second sensor unit are connected in parallel to the driving driver.

The magnet may be coupled to the mover to linearly move between a first point closest to an image side and a second point closest to an object side.

The first sensor unit may be disposed to correspond to a position between the first point and a third point between the first point and the second point.

The second sensor unit may be disposed to correspond to a position between the second point and a third point between the first point and the second point.

The first sensor unit may be disposed to be spaced a predetermined distance from the second sensor unit in a moving direction of the mover, and the predetermined distance may be smaller than a length of the first sensor unit in the moving direction of the mover.

The first region and the second region may not overlap each other.

The driving driver may calibrate the first sensor unit to sense the first region based on a first sensing value sensed by the first sensor unit when the magnet is positioned at the first point and a second sensing value sensed by the first sensor unit when the magnet is positioned at a third point between the first point and the second point.

The driving driver may include a first amplification unit electrically connected to the first sensor unit and configured to amplify the first sensing signal based on a first gain value, and a first analog-to-digital convert (ADC) unit configured to receive the amplified first sensing signal and convert the received first sensing signal into a digital signal, and the first gain value may be set based on the first sensing value and the second sensing value.

The driving driver may calibrate the second sensor unit to sense the second region based on a third sensing value sensed by the second sensor unit when the magnet is positioned at the second point and a fourth sensing value sensed by the second sensor unit when the magnet is positioned at a third point between the first point and the second point.

The driving driver may include a second amplification unit electrically connected to the second sensor unit and configured to amplify the second sensing signal based on a second gain value, and a second ADC unit configured to receive the amplified second sensing signal and convert the received second sensing signal into a digital signal, and the second gain value may be set based on the third sensing value and the fourth sensing value.

Advantageous Effects

According to embodiments, it is possible to provide a camera module capable of measuring a position even during a long stroke of a mover.

It is possible to provide a camera module having a high sensing sensitivity.

Various and beneficial advantages and effects of the present invention are not limited to the above-described contents and will be more readily understood in a process of describing specific embodiments of the present invention.

MODES OF THE INVENTION

Hereinafter, exemplary embodiments according to the present invention will be described in detail with reference to the accompanying drawings.

However, the technical spirit of the present invention is not limited to some of the described embodiments, but may be implemented in various different forms, and one or more of the components among the embodiments may be used by being selectively coupled or substituted without departing from the scope of the technical spirit of the present invention.

In addition, terms (including technical and scientific terms) used in embodiments of the present invention may be construed as meaning that may be generally understood by those skilled in the art to which the present invention pertains unless explicitly specifically defined and described, and the meanings of the commonly used terms, such as terms defined in a dictionary, may be construed in consideration of contextual meanings of related technologies.

In addition, the terms used in the embodiments of the present invention are for describing the embodiments and are not intended to limit the present invention.

In the specification, a singular form may include a plural form unless otherwise specified in the phrase, and when described as "at least one (or one or more) of A, B, and C," one or more among all possible combinations of A, B, and C may be included.

In addition, terms such as first, second, A, B, (a), and (b) may be used to describe components of the embodiments of the present invention.

These terms are only for the purpose of distinguishing one component from another component, and the nature, sequence, order, or the like of the corresponding components is not limited by these terms.

In addition, when a first component is described as being "connected," "coupled," or "joined" to a second component, it may include a case in which the first component is directly connected, coupled, or joined to the second component, but also a case in which the first component is "connected," "coupled," or "joined" to the second component by other components present between the first component and the second component.

In addition, when a certain component is described as being formed or disposed on "on (above)" or "below (under)" another component, the terms "on (above)" or "below (under)" may include not only a case in which two components are in direct contact with each other, but also a case in which one or more other components are formed or disposed between the two components. In addition, when described as "on (above) or below (under)," it may include the meaning of not only an upward direction but also a downward direction based on one component.

Figure 1:
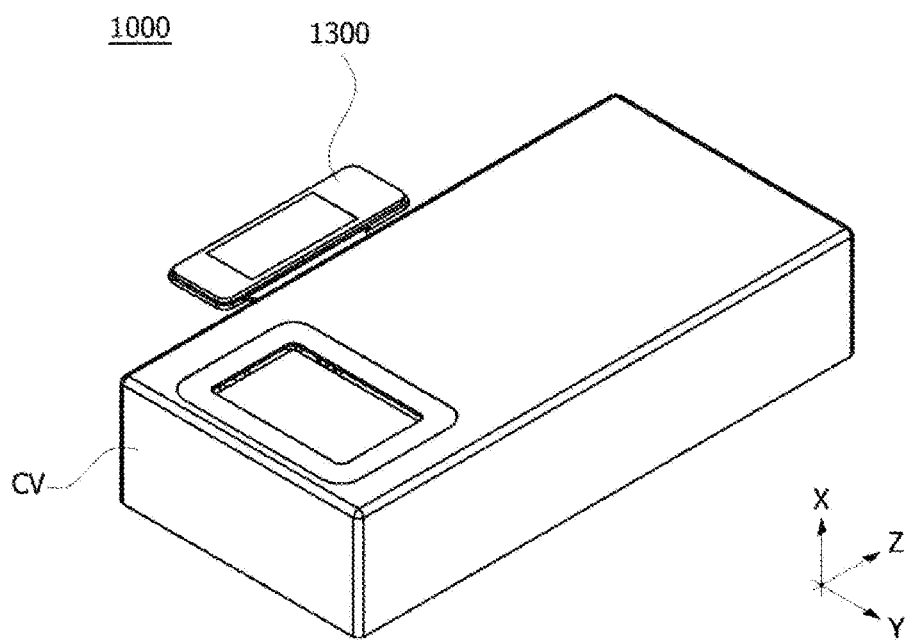
FIG. 1 is a perspective view of a camera module according to an embodiment.
Figure 2:
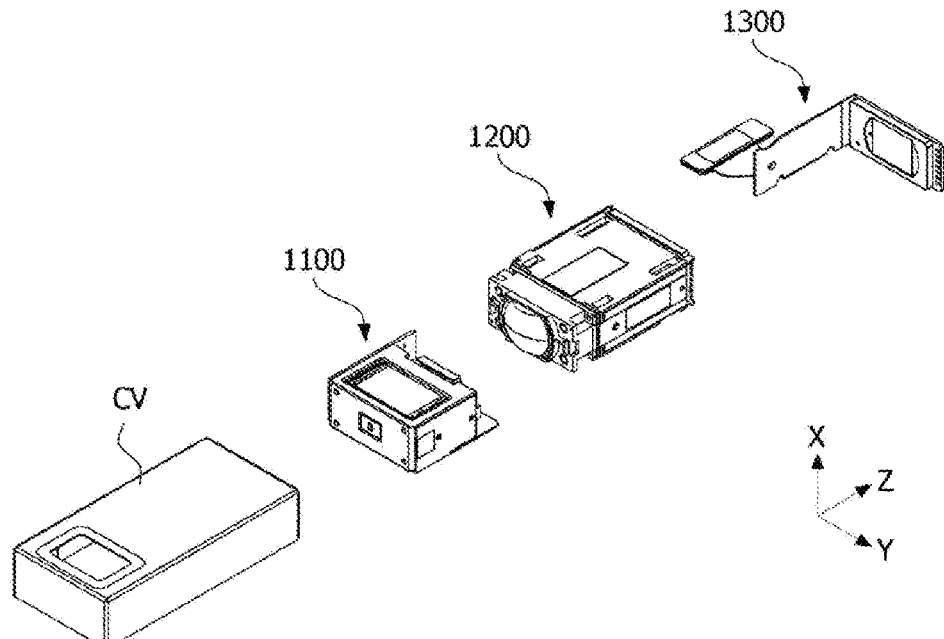
FIG. 2 is an exploded perspective view of the camera module according to the embodiment.
Figure 3:
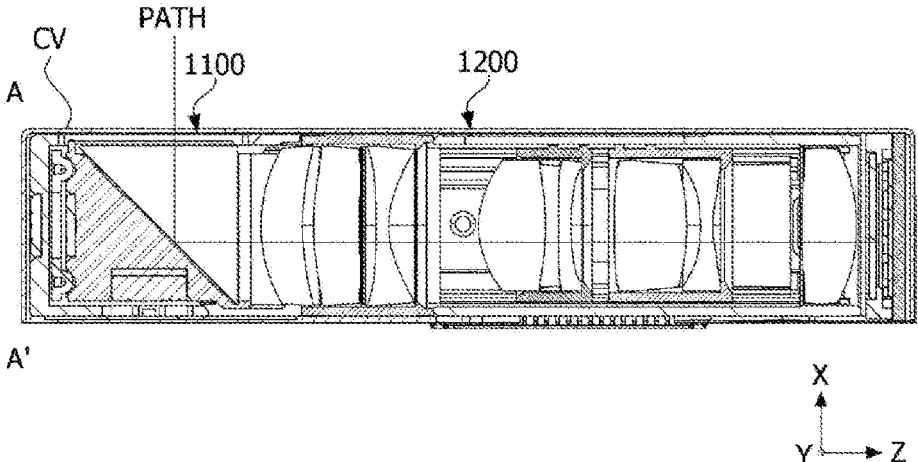
FIG. 3 is a cross-sectional view along line A-A' in FIG. 1.

FIG. 1 is a perspective view of a camera module according to an embodiment, FIG. 2 is an exploded perspective view illustrating the camera module according to the embodiment, and FIG. 3 is a cross-sectional view along line A-A' in FIG. 1.

Referring to FIGS. 1 and 2, a camera module 1000 according to the embodiment may include a cover CV, a first camera actuator 1100, a second camera actuator 1200, and a circuit board 1300. Here, the first camera actuator 1100 may be used interchangeably with "first actuator," and the second camera actuator 1200 may be used interchangeably with "second actuator."

The cover CV may cover the first camera actuator 1100 and the second camera actuator 1200. It is possible to increase a coupling strength between the first camera actuator 1100 and the second camera actuator 1200 by the cover CV.

Furthermore, the cover CV may be made of a material that blocks electromagnetic waves. Therefore, it is possible to easily protect the first camera actuator 1100 and the second camera actuator 1200 in the cover CV.

In addition, the first camera actuator 1100 may be an optical image stabilizer (OIS) actuator.

The first camera actuator 1100 may include a fixed focal length lens disposed in a predetermined barrel (not illustrated). The fixed focal length lens may be referred to as "single focal length lens" or "single lens."

The first camera actuator 1100 may change an optical path. In an embodiment, the first camera actuator 1100 may vertically change the optical path through an internal optical member (e.g., a mirror). With this configuration, even when a thickness of a mobile terminal decreases, a configuration of a lens that is larger than the thickness of the mobile terminal is disposed in the mobile terminal so that zooming, auto focusing (AF), and OIS functions may be performed through the change in the optical path.

The second camera actuator 1200 may be disposed at a rear end of the first camera actuator 1100. The second camera actuator 1200 may be coupled to the first camera actuator 1100. In addition, the mutual coupling may be performed in any of various methods.

In addition, the second camera actuator 1200 may be a zoom actuator or an AF actuator. For example, the second camera actuator 1200 may support one lens or a plurality of lenses and perform an AF function or a zooming function by moving the lenses according to a predetermined control signal of a control unit.

The circuit board 1300 may be disposed at a rear end of the second camera actuator 1200. The circuit board 1300 may be electrically connected to the second camera actuator 1200 and the first camera actuator 1100. In addition, a plurality of circuit boards 1300 may be provided.

A camera module according to the embodiment may be formed of one camera module or a plurality of camera modules. For example, the plurality of camera modules may include a first camera module and a second camera module.

In addition, the first camera module may include one actuator or a plurality of actuators. For example, the first camera module may include the first camera actuator 1100 and the second camera actuator 1200.

In addition, the second camera module may include an actuator (not illustrated) disposed in a predetermined housing (not illustrated) and capable of driving a lens unit. Although the actuator may be a voice coil motor, a micro actuator, a silicone actuator, or the like and applied in various methods such as an electrostatic method, a thermal method, a bimorph method, and an electrostatic force method, the present invention is not limited thereto. In addition, in the specification, the camera actuator may be referred to as "actuator" or the like. In addition, the camera module formed of the plurality of camera modules may be mounted in various electronic devices such as a mobile terminal.

Referring to FIG. 3, the camera module according to the embodiment may include the first camera actuator 1100 for performing the OIS function and the second camera actuator 1200 for performing the zooming function and the AF function.

Light may enter the camera module through an opening region positioned in an upper surface of the first camera actuator 1100. In other words, the light may enter the first camera actuator 1100 in an optical axis direction (e.g., an X-axis direction), and the optical path may be changed in a vertical direction (e.g., a Z-axis direction) through the optical member. In addition, the light may pass through the second camera actuator 1200 and enter an image sensor IS positioned at one end of the second camera actuator 1200 (PATH).

In the specification, a lower surface refers to one side in the first direction. In addition, the first direction is the X-axis direction in the drawings and may be used interchangeably with a second axis direction or the like. A second direction is a Y-axis direction in the drawings and may be used interchangeably with a first axis direction or the like. The second direction is a direction perpendicular to the first direction. In addition, a third direction is the Z-axis direction in the drawings and may be used interchangeably with a third axis direction or the like. The third direction is perpendicular to both the first direction and the second direction. Here, the third direction (Z-axis direction) corresponds to the optical axis direction, and the first direction (X-axis direction) and the second direction (Y-axis direction) are directions perpendicular to the optical axis and may be tilted by the second camera actuator. Detailed description thereof will be made below.

In addition, hereinafter, the optical axis direction is the third direction (Z-axis direction) in the description of the second camera actuator 1200 will be described below based on this.

In addition, with this configuration, the camera module according to the embodiment may resolve the spatial limits of the first camera actuator and the second camera actuator by changing the optical path. In other words, the camera module according to the embodiment may extend the optical path in response to the change in the optical path while minimizing the thickness of the camera module. Furthermore, it should be understood that the second camera actuator may provide a high range of magnification by controlling a focus or the like in the extended optical path.

In addition, the camera module according to the embodiment may implement an OIS by controlling the optical path through the first camera actuator, thereby minimizing the occurrence of a decentering or tilting phenomenon and providing the best optical characteristics.

Furthermore, the second camera actuator 1200 may include an optical system and a lens driving unit. For example, at least one of a first lens assembly, a second lens assembly, a third lens assembly, and a guide pin may be disposed in the second camera actuator 1200.

In addition, the second camera actuator 1200 may include a coil and a magnet to perform a high-magnification zooming function.

For example, although the first lens assembly and the second lens assembly may be moving lenses that move through the coil, the magnet, and the guide pin and the third lens assembly may be a fixed lens, the present invention is not limited thereto. For example, the third lens assembly may perform a function of a focator by which light forms an image at a specific position, and the first lens assembly may perform a function of a variator for re-forming an image formed by the third lens assembly, which is the focator, at another position. Meanwhile, the first lens assembly may be in a state in which a magnification change is large because a distance to a subject or an image distance is greatly changed, and the first lens assembly, which is the variator, may play an important role in a focal length or magnification change of the optical system. Meanwhile, imaging points of an image formed by the first lens assembly, which is the variator, may be slightly different depending on a position. Therefore, the second lens assembly may perform a position compensation function for the image formed by the variator. For example, the second lens assembly may perform a function of a compensator for accurately forming an image at an actual position of the image sensor using the imaging points of the image formed by the first lens assembly which is the variator. For example, the first lens assembly and the second lens assembly may be driven by an electromagnetic force generated by the interaction between the coil and the magnet. The above description may be applied to a lens assembly to be described below.

Meanwhile, when the OIS actuator and the AF or zoom actuator are disposed according to the embodiment of the present invention, it is possible to prevent the magnetic field interference with an AF or zoom magnet when an OIS is driven. Since a first driving magnet of the first camera actuator 1100 is disposed separately from the second camera actuator 1200, it is possible to prevent the magnetic field interference between the first camera actuator 1100 and the second camera actuator 1200. In the specification, an OIS may be used interchangeably with terms such as hand shaking correction, optical image stabilization, optical image correction, or shaking correction.

Figure 4:
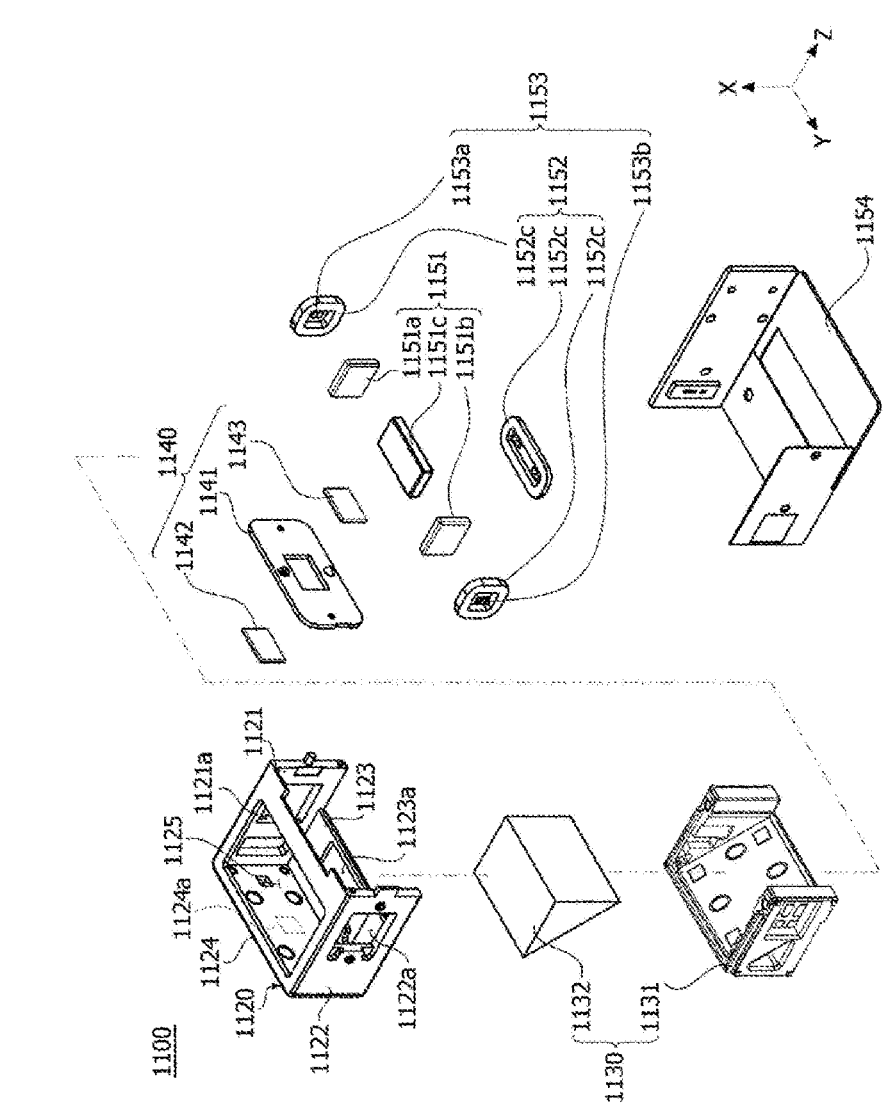
FIG. 4 is an exploded perspective view of a first camera actuator according to the embodiment.

FIG. 4 is an exploded perspective view of the second camera actuator according to the embodiment.

Referring to FIG. 4, the second camera actuator 1200 according to the embodiment includes a first shield can (not illustrated), a first housing 1120, a mover 1130, a rotating unit 1140, and a first driving unit 1150.

The mover 1130 may include a holder 1131 and an optical member 1132 seated on the holder 1131. In addition, the rotating unit 1140 includes a rotating plate 1141, a first magnet 1142 having a coupling strength with the rotating plate 1141, and a second magnet 1143 positioned in the rotating plate 1141. In addition, the first driving unit 1150 includes a driving magnet 1151, a driving coil 1152, a Hall sensor unit 1153, and a first board unit 1154.

The first shield can (not illustrated) may be positioned at an outermost side of the second camera actuator 1200 and positioned to surround the rotating unit 1140 and the first driving unit 1150, which will be described below.

The first shield can (not illustrated) can block or reduce electromagnetic waves generated from the outside. Therefore, it is possible to reduce the occurrence of malfunction in the rotating unit 1140 or the first driving unit 1150.

The first housing 1120 may be positioned inside the first shield can (not illustrated). In addition, the first housing 1120 may be positioned inside a first board unit 1154 to be described below. The first housing 1120 may be fastened by being fitted into or matched with the first shield can (not illustrated).

The first housing 1120 may be formed of a plurality of housing side portions. The first housing 1120 may include a first housing side portion 1121, a second housing side portion 1122, a third housing side portion 1123, and a fourth housing side portion 1124.

The first housing side portion 1121 and the second housing side portion 1122 may be disposed to face each other. In addition, the third housing side portion 1123 and the fourth housing side portion 1124 may be disposed between the first housing side portion 1121 and the second housing side portion 1122.

The third housing side portion 1123 may be in contact with the first housing side portion 1121, the second housing side portion 1122, and the fourth housing side portion 1124. In addition, the third housing side portion 1123 may be a lower side portion of the first housing 1120 and may include a lower surface.

In addition, the first housing side portion 1121 may include a first housing hole 1121a. The first coil 1152a to be described below may be positioned in the first housing hole 1121a.

In addition, the second housing side portion 1122 may include a second housing hole 1122a. In addition, the second coil 1152b to be described below may be positioned in the second housing hole 1122a.

The first coil 1152a and the second coil 1152b may be coupled to the first board unit 1154. In the embodiment, the first coil 1152a and the second coil 1152b may be electrically connected to the first board unit 1154 so that a current may flow therebetween. The current is an element of an electromagnetic force capable of tilting the second camera actuator with respect to an X-axis.

In addition, the third housing side portion 1123 may include a third housing hole 1123a. A third coil 1152c to be described below may be positioned in the third housing hole 1123a. The third coil 1152c may be coupled to the first board unit 1154. In addition, the third coil 1152c may be electrically connected to the first board unit 1154 so that a current may flow therebetween. The current is an element of an electromagnetic force capable of tilting the second camera actuator with respect to a Y-axis.

The fourth housing side portion 1124 may include a first housing groove 1124a. The first magnet 1142 to be described below may be disposed in a region facing the first housing groove 1124a. Therefore, the first housing 1120 may be coupled to the rotating plate 1141 by a magnetic force or the like.

In addition, the first housing groove 1124a according to the embodiment may be positioned on an inner surface or an outer surface of the fourth housing side portion 1124.

Therefore, the first magnet 1142 may also be disposed to correspond to a position of the first housing groove 1124a.

In addition, the first housing 1120 may include an accommodating part 1125 formed by the first to fourth housing side portions 1121 to 1124. The mover 1130 may be positioned in the accommodating part 1125.

The mover 1130 may include the holder 1131 and the optical member 1132 seated on the holder 1131.

The holder 1131 may be seated in an accommodating part 1125 of the first housing 1120. The holder 1131 may include a first prism outer surface to a fourth prism outer surface respectively corresponding to the first housing side portion 1121, the second housing side portion 1122, the third housing side portion 1123, and the fourth housing side portion 1124.

A seating groove in which the second magnet 1143 may be seated may be disposed in the fourth prism outer surface facing the fourth housing side portion 1124.

The optical member 1132 may be seated on the holder 1131. To this end, the holder 1131 may have a seating surface, and the seating surface may be formed by an accommodating groove. The optical member 1132 may include a reflector disposed therein. However, the present invention is not limited thereto. In addition, the optical member 1132 may reflect light reflected from the outside (e.g., an object) into the camera module. In other words, the optical member 1132 can resolve spatial limits of the first camera actuator and the second camera actuator by changing the path of the reflected light. Therefore, it should be understood that the camera module may provide a high range of magnification by extending the optical path while minimizing a thickness thereof.

The rotating unit 1140 includes the rotating plate 1141, the first magnet 1142 having the coupling strength with the rotating plate 1141, and the second magnet 1143 positioned in the rotating plate 1141.

The rotating plate 1141 may be coupled to the mover 1130 and the first housing 1120. The rotating plate 1141 may include an additional magnet (not illustrated) positioned therein.

In addition, the rotating plate 1141 may be disposed adjacent to the optical axis. Therefore, the actuator according to the embodiment may easily change the optical path according to first-axis tilting and second-axis tilting to be described below.

The rotating plate 1141 may include first protruding portions disposed to be spaced apart from each other in the first direction (X-axis direction) and second protruding portions disposed to be spaced apart from each other in the second direction (Y-axis direction). In addition, the first protruding portion and the second protruding portion may protrude in opposite directions. Detailed description thereof will be made below.

In addition, the first magnet 1142 includes a plurality of yokes, and the plurality of yokes may be positioned to face each other based on the rotating plate 1141. In the embodiment, the first magnet 1142 may include a plurality of facing yokes. In addition, the rotating plate 1141 may be positioned between the plurality of yokes.

As described above, the first magnet 1142 may be positioned in the first housing 1120. In addition, as described above, the first magnet 1142 may be seated on the inner surface or outer surface of the fourth housing side portion 1124. For example, the first magnet 1142 may be seated in a groove formed in the outer surface of the fourth housing side portion 1124. Alternatively, the first magnet 1142 may be seated in the first housing groove 1124a.

In addition, the second magnet 1143 may be positioned on the mover 1130, particularly, an outer surface of the holder 1131. With this configuration, the rotating plate 1141 may be easily coupled to the first housing 1120 and the mover 1130 by the coupling strength generated by a magnetic force between the second magnet 1143 and the first magnet 1142 disposed therein. In the present invention, the positions of the first magnet 1142 and the second magnet 1143 may be interchanged.

The first driving unit 1150 includes the driving magnet 1151, the driving coil 1152, the Hall sensor unit 1153, and the first board unit 1154.

The driving magnet 1151 may include a plurality of magnets. In the embodiment, the driving magnet 1151 may include a first magnet 1151a, a second magnet 1151b, and a third magnet 1151c.

The first magnet 1151a, the second magnet 1151b, and the third magnet 1151c may each be positioned on the outer surface of the holder 1131. In addition, the first magnet 1151a and the second magnet 1151b may be positioned to face each other. In addition, the third magnet 1151c may be positioned on a lower surface of the outer surface of the holder 1131. Detailed description thereof will be made below.

The driving coil 1152 may include a plurality of coils. In the embodiment, the driving coil 1152 may include the first coil 1152a, the second coil 1152b, and the third coil 1152c.

The first coil 1152a may be positioned to face the first magnet 1151a. Therefore, as described above, the first coil 1152a may be positioned in the first housing hole 1121a of the first housing side portion 1121.

In addition, the second coil 1152b may be positioned to face the second magnet 1151b. Therefore, as described above, the second coil 1152b may be positioned in the second housing hole 1122a of the second housing side portion 1122.

The first coil 1152a may be positioned to face the second coil 1152b. In other words, the first coil 1152a may be symmetrically disposed with the second coil 1152b with respect to the first direction (X-axis direction). This may also be applied to the first magnet 1151a and the second magnet 1151b in the same manner. In other words, the first magnet 1151a and the second magnet 1151b may be symmetrically disposed with respect to the first direction (X-axis direction). In addition, at least portions of the first coil 1152a, the second coil 1152b, the first magnet 1151a, and the second magnet 1151b may be disposed to overlap in the second direction (Y-axis direction). With this configuration, the X-axis tilting may be accurately performed without being biased to one side by the electromagnetic force between the first coil 1152a and the first magnet 1151a and the electromagnetic force between the second coil 1152b and the second magnet 1151b.

The third coil 1152c may be positioned to face the third magnet 1151c. Therefore, as described above, the third coil 1152c may be positioned in the third housing hole 1123a of the third housing side portion 1123. The third coil 1152c may generate an electromagnetic force with the third magnet 1151c so that a Y-axis tilting may be performed on the mover 1130 and the rotating unit 1140 based on the first housing 1120.

Here, an X-axis tilting is a tilting with respect to the X-axis, and a Y-axis tilting is a tilting with respect to the Y-axis.

The Hall sensor unit 1153 may include a plurality of Hall sensors. The Hall sensor corresponds to and is used interchangeably with "sensor unit" to be described below. In the embodiment, the Hall sensor unit 1153 may include a first Hall sensor 1153a, a second Hall sensor 1153b, and a third Hall sensor 1153c.

The first Hall sensor 1153a may be positioned inside the first coil 1152a. In addition, the second Hall sensor 1153b may be disposed symmetrically with the first Hall sensor 1153a in the first direction (X-axis direction) and the third direction (Z-axis direction). In addition, the second Hall sensor 1153b may be positioned inside the second coil 1152b.

The first Hall sensor 1153a may detect a change in magnetic flux inside the first coil 1152a. In addition, the second Hall sensor 1153b may detect a change in magnetic flux in the second coil 1152b. Therefore, it is possible to perform position sensing between the first and second magnets 1151a and 1151b and the first and second Hall sensors 1153a and 1153b. For example, the first and second Hall sensors 1153a and 1153b may detect the change in magnet fluxes, and thus the second camera actuator according to the embodiment may control the X-axis tilting.

In addition, the third Hall sensor 1153c may be positioned inside the third coil 1153c. The third Hall sensor 1153c may detect a change in magnetic flux inside the third coil 1153c. Therefore, it is possible to perform position sensing between the third magnet 1151c and the third Hall sensor 1153c. Therefore, the second camera actuator according to the embodiment may control the Y-axis tilting.

The first board unit 1154 may be positioned under the first driving unit 1150. The first board unit 1154 may be electrically connected to the driving coil 1152 and the Hall sensor unit 1153. For example, the first board unit 1154 may be coupled to the driving coil 1152 and the Hall sensor unit 1153 by a surface mount technology (SMT). However, the present invention is not limited to this method.

The first board unit 1154 may be positioned between the first shield can (not illustrated) and the first housing 1120 and coupled to the shield can 1101 and the first housing 1120. The coupling method may be variously performed as described above. In addition, through the coupling, the driving coil 1152 and the Hall sensor unit 1153 may be positioned within an outer surface of the first housing 1120.

The first board unit 1154 may include a circuit board having wiring patterns that may be electrically connected, such as a rigid printed circuit board (rigid PCB), a flexible PCB, and a rigid-flexible PCB. However, the present invention is not limited to these types.

Detailed descriptions of the Hall sensor unit 1153 and the first board unit 1154 to be described below will be made below.

Figure 5:
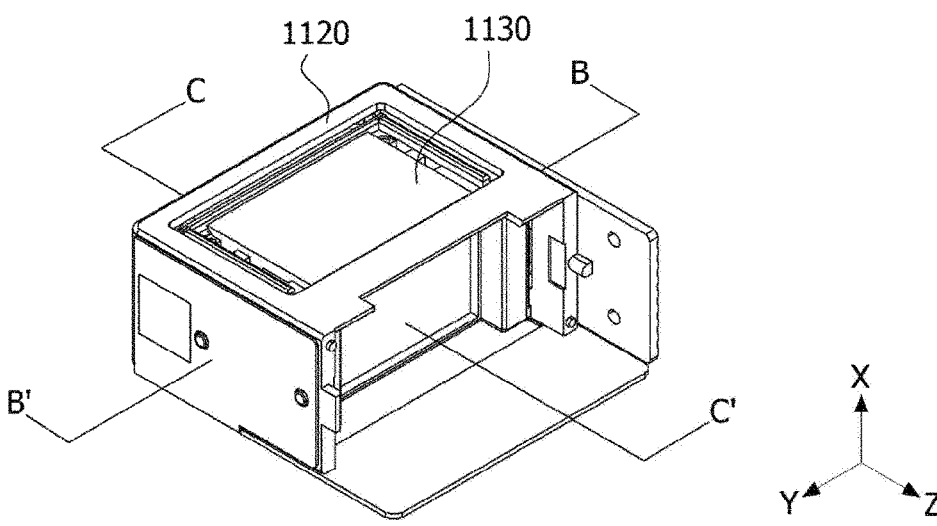
FIG. 5 is a perspective view of the first camera actuator according to the embodiment from which a first shield can and a board are removed.
Figure 6:
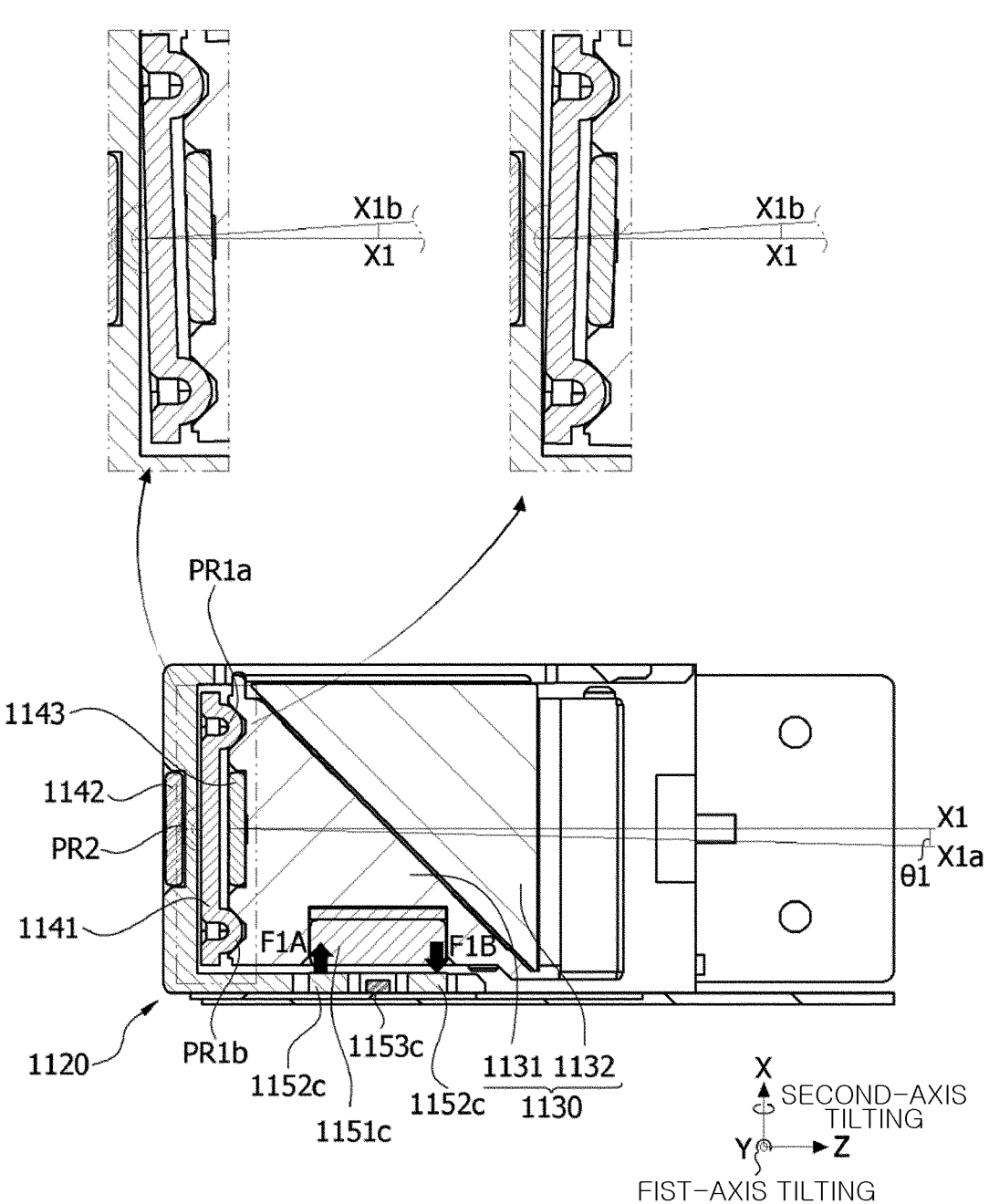
FIG. 6 is a cross-sectional view along line B-B' in FIG. 5.
Figure 7:
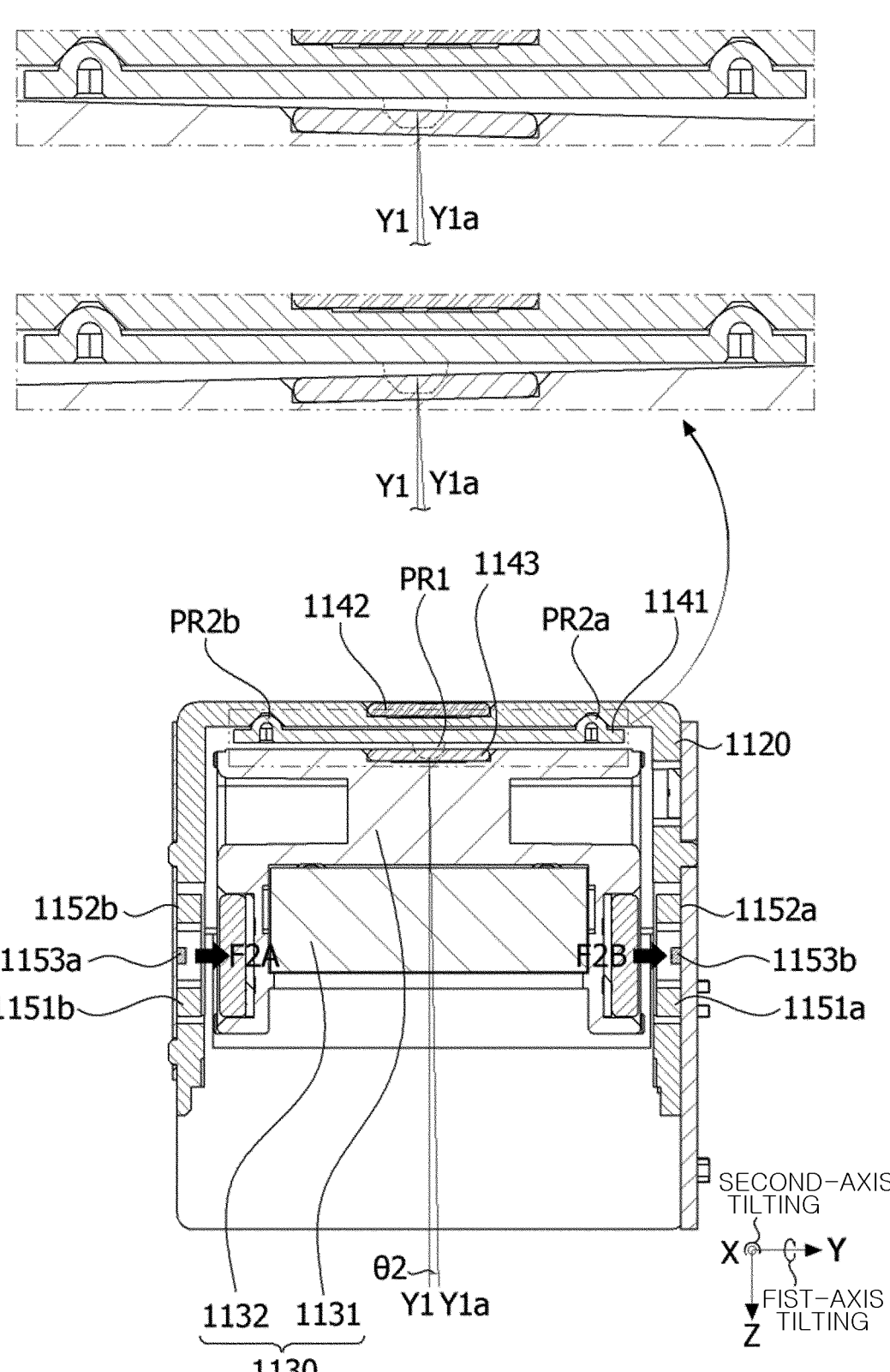
FIG. 7 is a cross-sectional view along line C-C' in FIG. 5.

FIG. 5 is a perspective view of the first camera actuator according to the embodiment from which a first shield can and a board are removed, FIG. 6 is a cross-sectional view along line B-B' in FIG. 5, and FIG. 7 is a cross-sectional view along line C-C' in FIG. 5.

Referring to FIGS. 5 to 7, the first coil 1152a may be positioned on the first housing side portion 1121.

In addition, the first coil 1152a and the first magnet 1151a may be positioned to face each other. At least a portion of the first magnet 1151a may overlap the first coil 1152a in the second direction (Y-axis direction).

In addition, the second coil 1152b may be positioned on the second housing side portion 1122. Therefore, the second coil 1152b and the second magnet 1151b may be positioned to face each other. At least a portion of the second magnet 1151b may overlap the second coil 1152b in the second direction (Y-axis direction).

In addition, the first coil 1152a and the second coil 1152b may overlap each other in the second direction (Y-axis direction), and the first magnet 1151a and the second magnet 1151b may overlap each other in the second direction (Y-axis direction). With this configuration, the electromagnetic force applied to the outer surfaces of the holder (the first holder outer surface and the second holder outer surface) may be positioned on parallel axes in the second direction (Y-axis direction) so that the X-axis tilting may be performed accurately and precisely.

In addition, a first accommodating groove (not illustrated) may be positioned at the fourth holder outer surface. In addition, first protrusions PR1a and PR1b may be disposed in the first accommodating groove. Therefore, when the X-axis tilting is performed, the first protrusions PR1a and PR1b may serve as reference axes (or rotation axes) of the tilting. Therefore, the rotating plate 1141 and the mover 1130 may move to a left or right side.

As described above, the second protruding portion PR2 may be seated in a groove of the inner surface of the fourth housing side portion 1124. In addition, when the Y-axis tilting is performed, the rotating plate and the mover may be rotated using the second protruding portion PR2 as a reference axis of the Y-axis tilting.

According to the embodiment, an OIS can be performed by the first protruding portion and the second protruding portion.

Referring to FIG. 6, the Y-axis tilting may be performed. In other words, an OIS can be implemented by rotating the first camera actuator in the first direction (X-axis direction).

In the embodiment, the third magnet 1151c disposed under the holder 1131 may generate the electromagnetic force with the third coil 1152c to tilt or rotate the mover 1130 in the first direction (X-axis direction).

Specifically, the rotating plate 1141 may be coupled to the first housing 1120 and the mover 1130 by the first magnet 1142 in the first housing 1120 and the second magnet 1143 in the mover 1130. In addition, the first protruding portions PR1 may be spaced apart from each other in the first direction (X-axis direction) and supported by the first housing 1120.

In addition, the rotating plate 1141 may be rotated or tilted using the second protruding portion PR2 protruding toward the mover 1130 as a reference axis (or a rotation axis). In other words, the rotating plate 1141 may perform the Y-axis tilting using the second protruding portion PR2 as the reference axis.

For example, an OIS can be implemented by rotating (X1->X1b) the mover 1130 at a first angle θ1 in the X-axis direction by first electromagnetic forces F1A and F1B between the third magnet 1151c disposed in the third seating groove and the third coil 1152c disposed on the third board side portion. The first angle θ1 may be in a range of ±1° to ±3°. However, the present invention is not limited thereto.

Referring to FIG. 7, the X-axis tilting may be performed. In other words, an OIS can be implemented by rotating the mover 1130 in the second direction (Y-axis direction).

The OIS can be implemented by tilting or rotating (or X-axis tilting) the mover 1130 in the Y-axis direction.

In the embodiment, the first magnet 1151a and the second magnet 1151b disposed in the holder 1131 may tilt or rotate the rotating plate 1141 and the mover 1130 in the second direction (Y-axis direction) by generating the electromagnetic force with the first coil 1152a and the second coil 1152b, respectively.

The rotating plate 1141 may be rotated or tilted (X-axis tilting) in the second direction using the first protruding portion PR1 as a reference axis (or a rotation axis).

For example, an OIS can be implemented by rotating (Y1->Y1a) the mover 1130 at a second angle θ2 in the Y-axis direction by second electromagnetic forces F2A and F2B between the first and second magnets 1151a and 1151b disposed in the first seating groove and the first and second coils 1152a and 1252b disposed on the first and second board side portions. The second angle θ2 may be in a range of ±1° to ±3°. However, the present invention is not limited thereto.

As described above, the second camera actuator according to the embodiment may control the rotating plate 1141 and the mover 1130 to rotate in the first direction (X-axis direction) or second direction (Y-axis direction) by the electromagnetic force between the first driving magnet in the holder and the first driving coil disposed in the housing, thereby minimizing the occurrence of a decentering or tilting phenomenon and providing the best optical characteristics upon implementing the OIS. In addition, as described above, "Y-axis tilting" corresponds to rotation or tilting in the first direction (X-axis direction), and "X-axis tilting" corresponds to rotation or tilting in the second direction (Y-axis direction)

Figure 8:
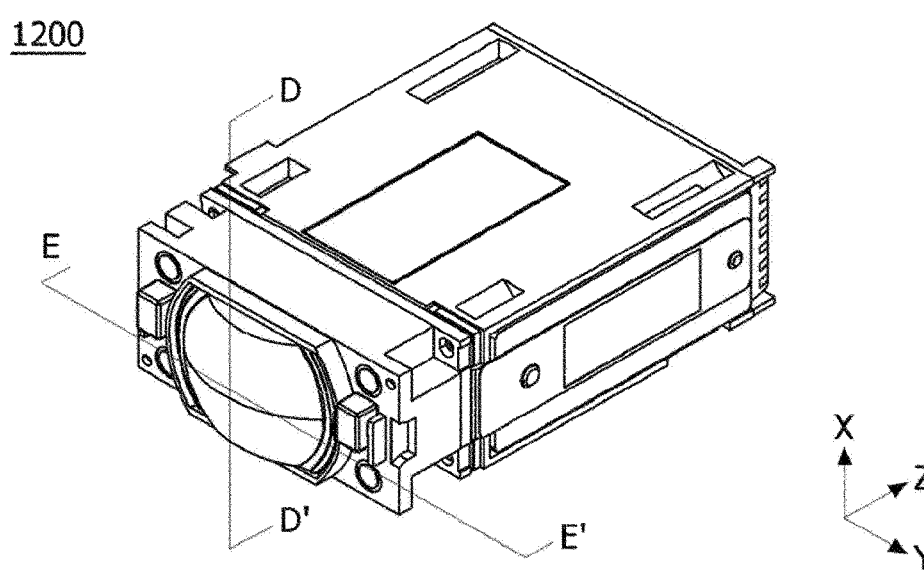
FIG. 8 is a perspective view of a second camera actuator according to the embodiment.
Figure 9:
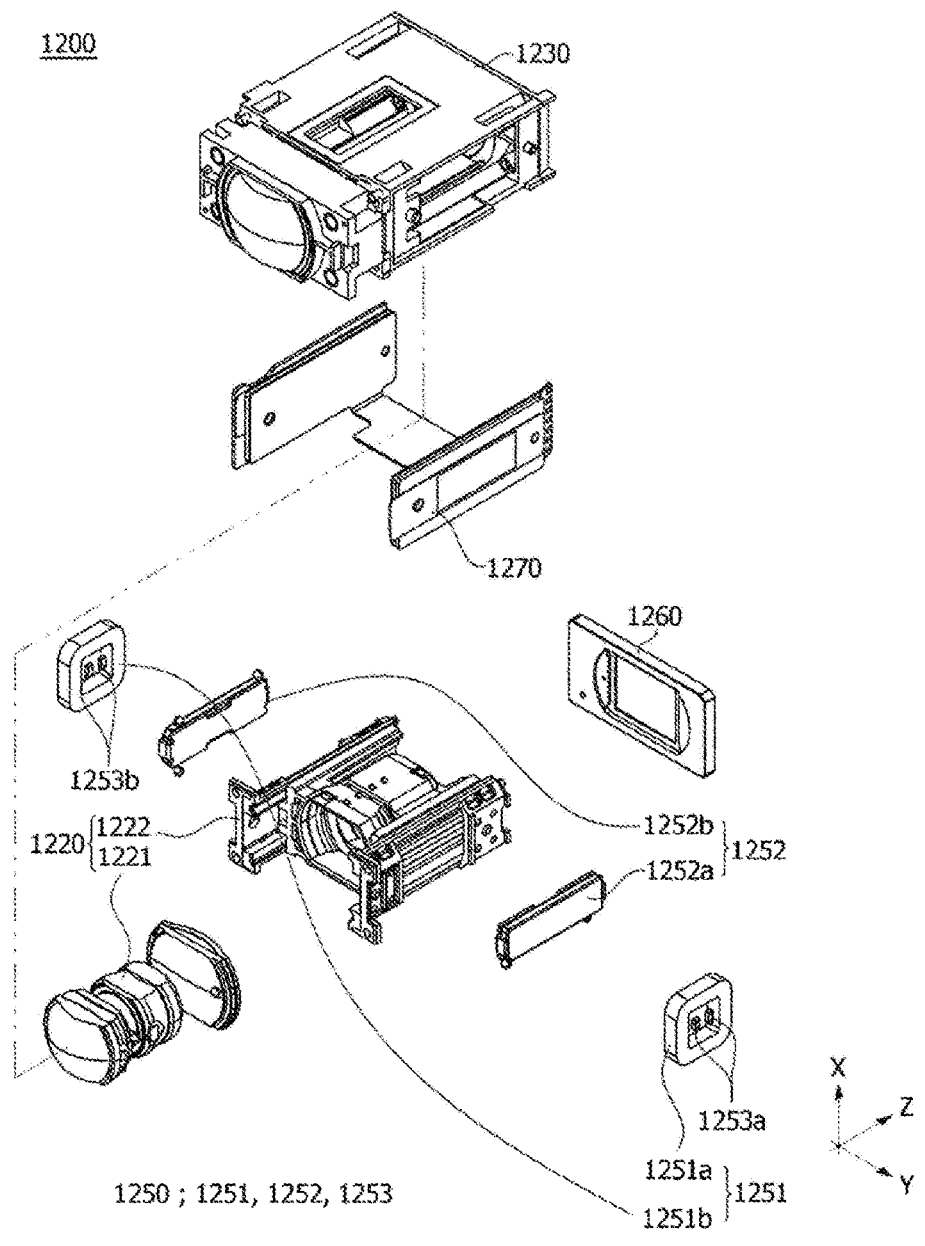
FIG. 9 is an exploded perspective view of the second camera actuator according to the embodiment.
Figure 10:
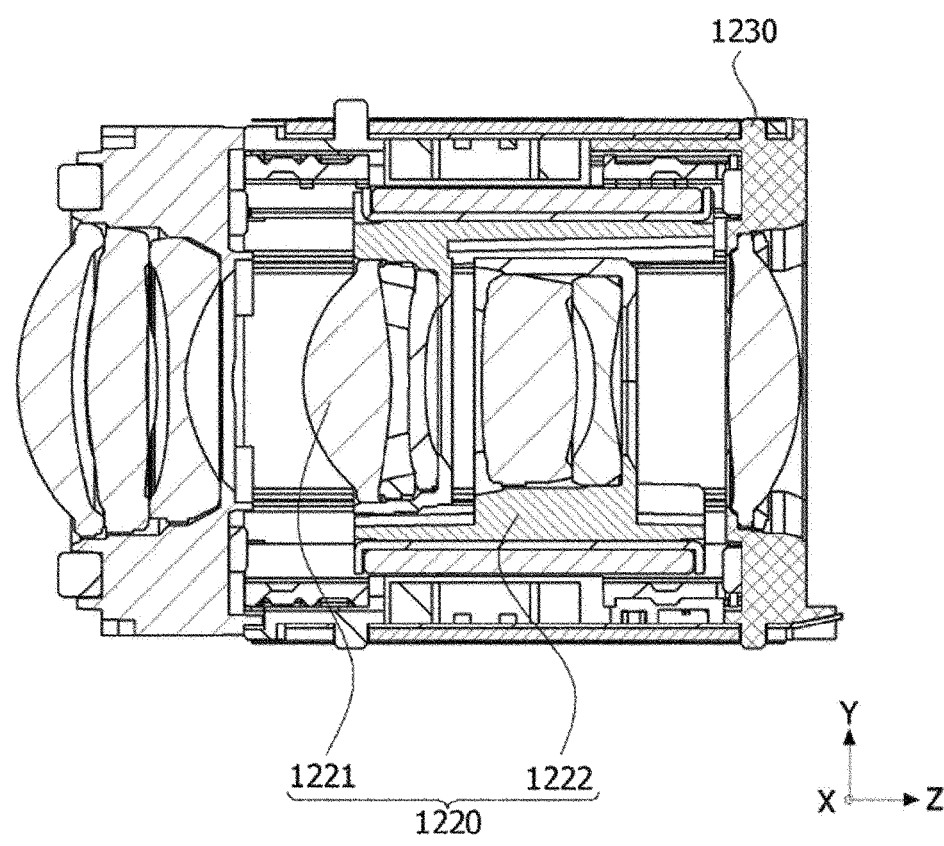
FIG. 10 is a cross-sectional view along line D-D' in FIG. 8.
Figure 11:
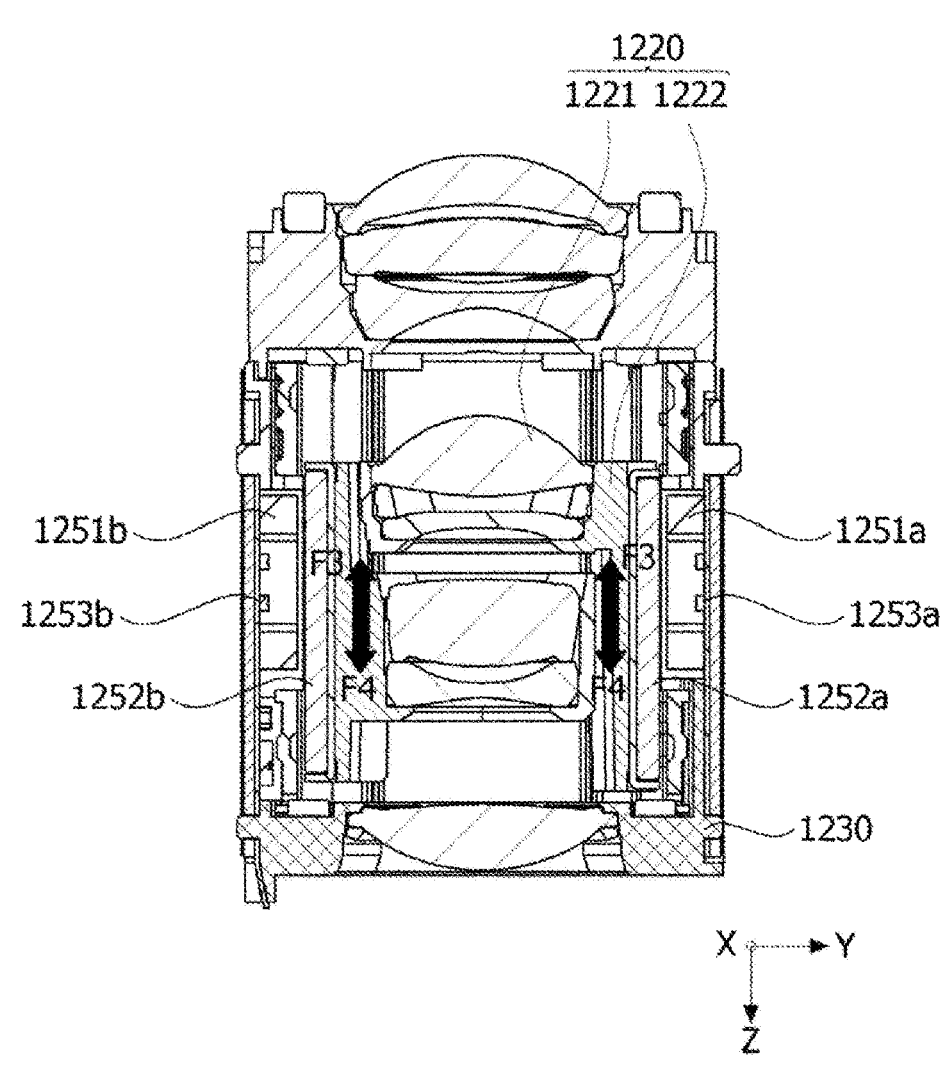
FIG. 11 is a cross-sectional view along line E-E' in FIG. 8.

FIG. 8 is a perspective view of a second camera actuator according to the embodiment, FIG. 9 is an exploded perspective view of the second camera actuator according to the embodiment, FIG. 10 is a cross-sectional view along line D-D' in FIG. 8, and FIG. 11 is a cross-sectional view along line E-E' in FIG. 8.

Referring to FIGS. 8 to 11, the second camera actuator 1200 according to the embodiment may include a lens unit 1220, a second housing 1230, a second driving unit 1250, a base unit (not illustrated), and a second board unit 1270. Furthermore, the second camera actuator 1200 may further include a second shield can (not illustrated), an elastic unit (not illustrated), and a bonding member (not illustrated). Furthermore, the second camera actuator 1200 according to the embodiment may further include an image sensor IS.

The second shield can (not illustrated) may be positioned in one region (e.g., an outermost side) of the second camera actuator 1200 and positioned to surround the components (the lens unit 1220, the second housing 1230, the second driving unit 1250, the base unit (not illustrated), the second board unit 1270, and the image sensor IS) to be describe below.

The second shield can (not illustrated) can block or reduce electromagnetic waves generated from the outside. Therefore, it is possible to reduce the occurrence of malfunction in the second driving unit 1250.

The lens unit 1220 may be positioned in the second shield can (not illustrated). The lens unit 1220 may move in the third direction (Z-axis direction). Therefore, the above-described AF function may be performed.

Specifically, the lens unit 1220 may include a lens assembly 1221 and a bobbin 1222.

The lens assembly 1221 may include at least one lens. In addition, although a plurality of lens assemblies 1221 may be formed, the following description will be made based on one lens assembly.

The lens assembly 1221 may be coupled to the bobbin 1222 and moved in the third direction (Z-axis direction) by an electromagnetic force generated from a fourth magnet 1252a and a second magnet 1252b coupled to the bobbin 1222.

The bobbin 1222 may include an opening region surrounding the lens assembly 1221. In addition, the bobbin 1222 may be coupled to the lens assembly 1221 by various methods. In addition, the bobbin 1222 may include a groove in a side surface thereof and may be coupled to the fourth magnet 1252*a* and the second magnet 1252*b* through the groove. A bonding member or the like may be applied to the groove.

In addition, the bobbin 1222 may be coupled to elastic units (not illustrated) on an upper end and a rear end thereof. Therefore, the bobbin 1222 may be supported by the elastic units (not illustrated) while moving in the third direction (Z-axis direction). In other words, a position of the bobbin 1222 may be maintained in the third direction (Z-axis direction). The elastic unit (not illustrated) may be formed of a leaf spring.

The second housing 1230 may be disposed between the lens unit 1220 and the second shield can (not illustrated). In addition, the second housing 1230 may be disposed to surround the lens unit 1220.

The second housing 1230 may have a hole formed in a side portion thereof. A fourth coil 1251*a* and a fifth coil 1251*b* may be disposed in the hole. The hole may be positioned to correspond to the above-described groove of the bobbin 1222.

The fourth magnet 1252*a* may be positioned to face the fourth coil 1251*a*. In addition, the second magnet 1252*b* may be positioned to face the fifth coil 1251*b*.

The elastic unit (not illustrated) may include a first elastic member (not illustrated) and a second elastic member (not illustrated). The first elastic member (not illustrated) may be coupled to an upper surface of the bobbin 1222. The second elastic member (not illustrated) may be coupled to a lower surface of the bobbin 1222. In addition, the first elastic member (not illustrated) and the second elastic member (not illustrated) may be formed of a leaf spring as described above. In addition, the first elastic member (not illustrated) and the second elastic member (not illustrated) may provide elasticity for moving the bobbin 1222.

The second driving unit 1250 may provide driving forces F3 and F4 for moving the lens unit 1220 in the third direction (Z-axis direction). The second driving unit 1250 may include a driving coil 1251 and a driving magnet 1252.

The lens unit 1220 may be moved in the third direction (Z-axis direction) by the electromagnetic force generated between the driving coil 1251 and the driving magnet 1252.

The driving coil 1251 may include the fourth coil 1251*a* and the fifth coil 1251*b*. The fourth coil 1251*a* and the fifth coil 1251*b* may be disposed in the holes formed in the side portions of the second housing 1230. In addition, the fourth coil 1251*a* and the fifth coil 1251*b* may be electrically connected to the second board unit 1270. Therefore, the fourth coil 1251*a* and the fifth coil 1251*b* may receive a current or the like through the second board unit 1270.

The driving magnet 1252 may include the fourth magnet 1252*a* and the fifth magnet 1252*b*. The fourth magnet 1252*a* and the fifth magnet 1252*b* may be disposed in the above-described groove of the bobbin 1222 and positioned to correspond to the fourth coil 1251*a* and the fifth coil 1251*b*.

The base unit (not illustrated) may be positioned between the lens unit 1220 and the image sensor IS. A component such as a filter may be fixed to the base unit (not illustrated). In addition, the base unit (not illustrated) may be disposed to surround the image sensor IS. With this configuration, since the image sensor IS is free from foreign substances and the like, it is possible to improve the reliability of the device.

In addition, the second camera actuator may be a zooming actuator or an AF actuator. For example, the second camera actuator may support one lens or a plurality of lenses and perform an AF function or a zooming function by moving the lenses according to a predetermined control signal of a control unit.

In addition, the second camera actuator may be a fixed zoom or a continuous zoom. For example, the second camera actuator may provide a movement of the lens assembly 1221.

In addition, the second camera actuator may be formed of a plurality of lens assemblies. For example, at least one of a first lens assembly, a second lens assembly (not illustrated), a third lens assembly (not illustrated), and a guide pin (not illustrated) may be disposed in the second camera actuator. The above-described contents may be applied thereto. Therefore, the second camera actuator may perform a high-magnification zooming function through the driving unit. For example, although the first lens assembly (not illustrated) and the second lens assembly (not illustrated) may be moving lenses that move through the driving unit and the guide pin (not illustrated) and the third lens assembly (not illustrated) may be a fixed lens, the present invention is not limited thereto. For example, the third lens assembly (not illustrated) may perform a function of a focator by which light forms an image at a specific position, and the first lens assembly (not illustrated) may perform a function of a variator for re-forming an image formed by the third lens assembly (not illustrated), which is the focator, at another position. Meanwhile, the first lens assembly (not illustrated) may be in a state in which a magnification change is large because a distance to a subject or an image distance is greatly changed, and the first lens assembly (not illustrated), which is the variator, may play an important role in a focal length or magnification change of the optical system. Meanwhile, imaging points of an image formed by the first lens assembly (not illustrated), which is the variator, may be slightly different depending on a position. Therefore, the second lens assembly (not illustrated) may perform a position compensation function for the image formed by the variator. For example, the second lens assembly (not illustrated) may perform a function of a compensator for accurately forming an image at an actual position of the image sensor using the imaging points of the image formed by the second lens assembly (not illustrated) that is the variator.

The image sensor IS may be positioned inside or outside the second camera actuator. In an embodiment, as illustrated, the image sensor IS may be positioned inside the second camera actuator. The image sensor IS may receive light and convert the received light into an electrical signal. In addition, the image sensor IS may include a plurality of pixels in the form of an array. In addition, the image sensor IS may be positioned on the optical axis.

Figure 12:
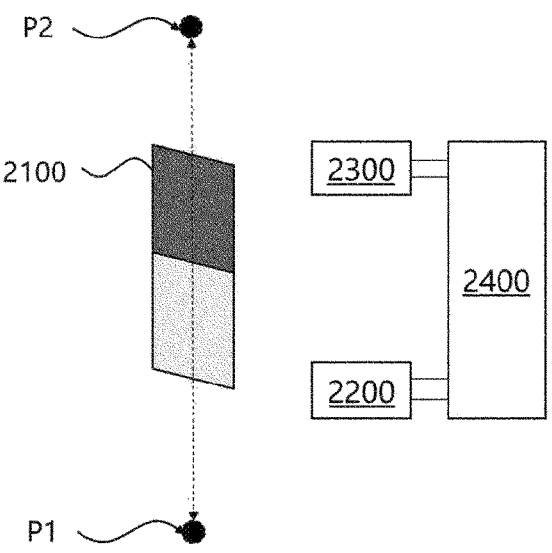
FIG. 12 is a conceptual diagram of the camera module in which a plurality of sensor units according to the embodiment of the present invention are disposed.

FIG. 12 is a conceptual diagram of the camera module in which a plurality of sensor units according to the embodiment of the present invention are disposed.

Referring to FIG. 12, the camera module according to the embodiment of the present invention may include a magnet 2100, a first sensor unit 2200, a second sensor unit 2300, and a driving driver 2400.

The magnet 2100 may be disposed on a mover for moving at least one lens. The magnet 2100 may be coupled to a side surface of the mover to move integrally. The magnet 2100 may provide a driving force to the mover by interacting with the coil that faces the magnet and is disposed in the housing. Here, the mover may be a lens holder. The mover may linearly move between a predetermined point closest to an image side and a predetermined point closest to an object side. Therefore, the magnet 2100 may be coupled to the mover to linearly move between a first point P1 closest to the image side and a second point P2 closest to the object side.

The first sensor unit 2200 may sense a position of the magnet 2100 corresponding to a first region among moving regions of the mover. The first sensor unit 2200 may be connected to the driving driver 2400. The first sensor unit 2200 is not connected to the second sensor unit 2300 and may be directly connected to the driving driver 2400. In other words, the first sensor unit 2200 may be connected to the driving driver 2400 in parallel to the second sensor unit 2300.

According to one embodiment, the first sensor unit 2200 may be a Hall sensor. However, the present invention is not limited thereto, and the first sensor unit 2200 may be a sensor device capable of detecting a position, such as a magnet reader.

The second sensor unit 2300 may sense a position of the magnet 2100 corresponding to a second region among the moving regions of the mover. The second sensor unit 2300 is not connected to the first sensor unit 2200 and may be directly connected to the driving driver 2400. In other words, the second sensor unit 2300 may be connected to the driving driver 2400 in parallel to the first sensor unit 2200.

According to one embodiment, the second sensor unit 2300 may be a Hall sensor. However, the present invention is not limited thereto, and the second sensor unit 2300 may be a sensor device capable of detecting a position, such as a magnet 2100 reader. The second sensor unit 2300 may be a sensor device of the type that is the same as that of the first sensor unit 2200.

The driving driver 2400 may receive a first sensing signal from the first sensor unit 2200 and a second sensing signal from the second sensor unit 2300. The driving driver 2400 may generate a final sensing signal based on the first sensing signal and the second sensing signal. The final sensing signal may be used by the camera module to measure the position (displacement) of the magnet.

Figure 13:
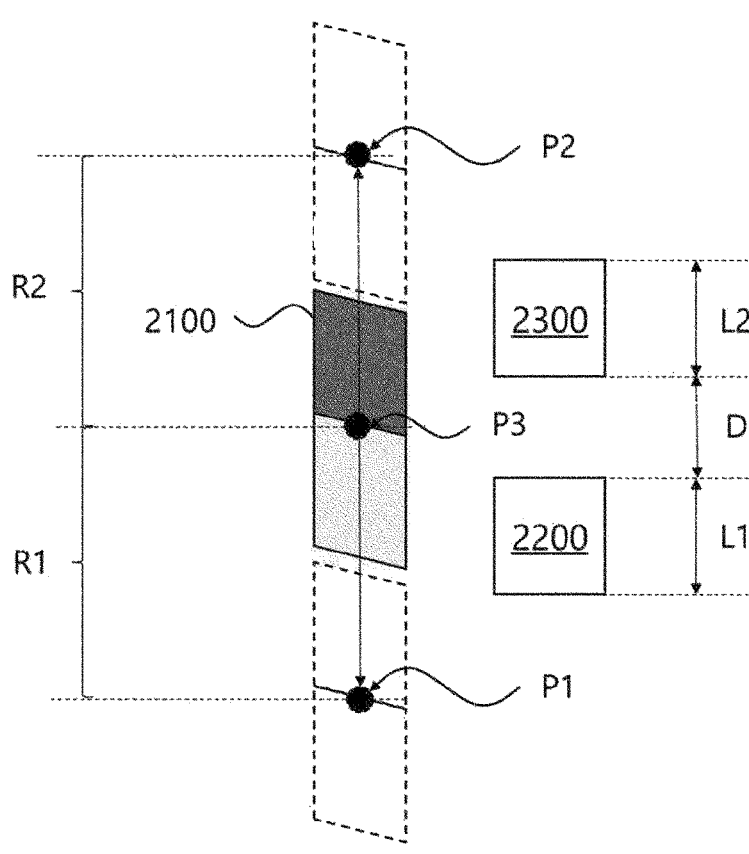
FIG. 13 is a view for describing an arrangement structure of the sensor unit according to the embodiment of the present invention.

FIG. 13 is a view for describing an arrangement structure of the sensor unit according to the embodiment of the present invention.

Referring to FIG. 13, the magnet 2100 may linearly move between the first point P1 and the second point P2. Here, the first point P1 may be the position of the magnet 2100 when the magnet 2100 is closest to the image side. For example, the first point P1 may be a center of the magnet 2100 when the magnet 2100 is closest to the image side or a specific point of the magnet 2100 closest to the image side. The second point P2 may be the position of the magnet 2100 when the magnet 2100 is closest to the object side. For example, the second point P2 may be a center of the magnet 2100 when the magnet 2100 is closest to the object side or a specific point of the magnet 2100 closest to the object side. In addition, a third point P3 may be a center point of the first point P1 and the second point P2. Therefore, a distance from the third point P3 to the first point P1 may be equal to a distance from the third point P3 to the second point P2. The first point P1 may be referred to as a bottom position, the second point P2 may be referred to as a top position, and the third point P3 may be referred to as a center position.

According to the embodiment of the present invention, a region between the first point P1 and the third point P3 may be referred to as a first region R1. In addition, a region between the second point P2 and the third point P3 may be referred to as a second region R2. Therefore, the first region R1 and the second region R2 may not overlap each other. The first region R1 and the second region R2 may extend in opposite directions.

The first sensor unit 2200 may be disposed to correspond to the first region R1. In other words, the first sensor unit 2200 may be disposed to correspond to a position between the third point P3 and the first point P1. The second sensor unit 2300 may be disposed to correspond to the second region R2. In other words, the second sensor unit 2300 may be disposed to correspond to a position between the third point P3 and the second point P2. The first sensor unit 2200 and the second sensor unit 2300 may be disposed side by side to correspond to the first region R1 and the second region R2, respectively, in a moving direction of the magnet 2100.

According to the embodiment of the present invention, the first sensor unit 2200 and the second sensor unit 2300 may be disposed to be spaced a predetermined distance D from each other in a moving direction of the mover (i.e., the moving direction of the magnet 2100).

In this case, the predetermined distance D may be smaller than a length L1 of the first sensor unit 2200 (i.e., a length of the first sensor unit 2200 in the moving direction of the mover). Since the second sensor unit 2300 may be the same sensor device as the first sensor unit 2200, the predetermined distance D may be smaller than a length L2 of the second sensor unit 2300 (i.e., a length of the second sensor unit 2300 in the moving direction of the mover).

Figure 14:
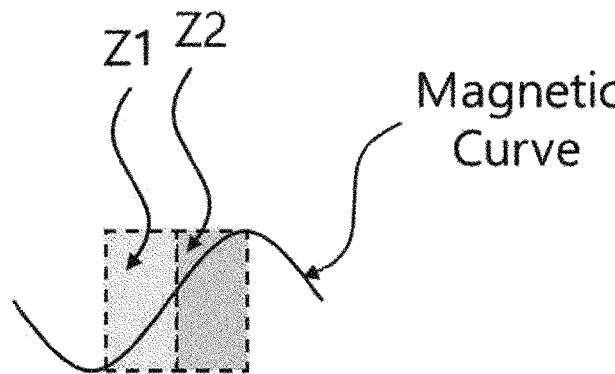
FIGS. 14 and 15 are views for describing a sensing process of the plurality of sensor units according to the embodiment of the present disclosure.
Figure 15:
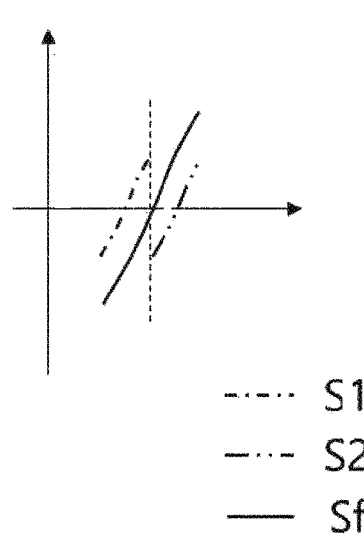

FIGS. 14 and 15 are views for describing a sensing process of the plurality of sensor units according to the embodiment of the present disclosure.

FIG. 14 illustrates sensing regions of the first sensor unit 2200 and the second sensor unit 2300 based on a magnetic force curve of the magnet 2100, and FIG. 15 illustrates a first sensing signal S1 and a second sensing signal S2 output according to FIG. 14, and a final sensing signal Sf generated based on the first sensing signal S1 and the second sensing signal S2. FIGS. 14 and 15 illustrate, for example, a case in which the first sensor unit 2200 and the second sensor unit 2300 are Hall sensors.

In general, the Hall sensor performs position sensing only for a linear region of the magnetic force curve of the magnet 2100. As a magnetic force density of the magnet 2100 increases, the linear region expands, and as the magnet 2100 with a high magnetic force density is disposed on the mover and the linear portion of the magnetic force curve of the magnet 2100 is maximally measured, a range of position measurement increases. In other words, it is possible to measure in a long stroke. However, since the Hall sensor has a limited measurement range, there is a problem that a linear region that may be measured by one Hall sensor is restricted. It is possible to expand the measurement range of the linear region of the magnetic force curve of the magnet 2100 by connecting a plurality of Hall sensors in series, but in this case, a non-linear region is also sensed due to the increased sensing sensitivity. When the Hall sensor also performs sensing on the non-linear region of the magnetic force curve, an error may occur in measuring the position of the magnet 2100. This may occur equally in sensor devices such as not only a Hall sensor but also a magnet reader.

On the other hand, as illustrated in FIGS. 14 and 15, in the embodiment of the present invention, each of the first sensor unit 2200 and the second sensor unit 2300 connected in parallel to the driving driver 2400 measures the corresponding linear region of the magnetic force curve. In other words, as illustrated in FIG. 14, the first sensor unit 2200 measures a first linear region Z1, and the second sensor unit 2300 measures a second linear region Z2. The first linear region Z1 of the magnetic force curve may correspond to the above-described first region, and the second linear region Z2 of the magnetic force curve may correspond to the above-described second region.

Then, as illustrated in FIG. 15, the first sensor unit 2200 outputs the first sensing signal S1 corresponding to the first linear region Z1, and the second sensor unit 2300 outputs the second sensing signal S2 corresponding to the second linear region Z2. Since the first sensor unit 2200 and the second sensor unit 2300 sense the position of the magnet 2100 corresponding to the first region and the second region, respectively, overlapping sensing regions may not occur. Therefore, when the final sensing signal Sf is generated using the first sensing signal S1 and the second sensing signal S2, as illustrated in FIG. 15, not only an accurate position value may be measured, but also the position measurement is possible even when the moving distance of the mover increases.

Figure 16:
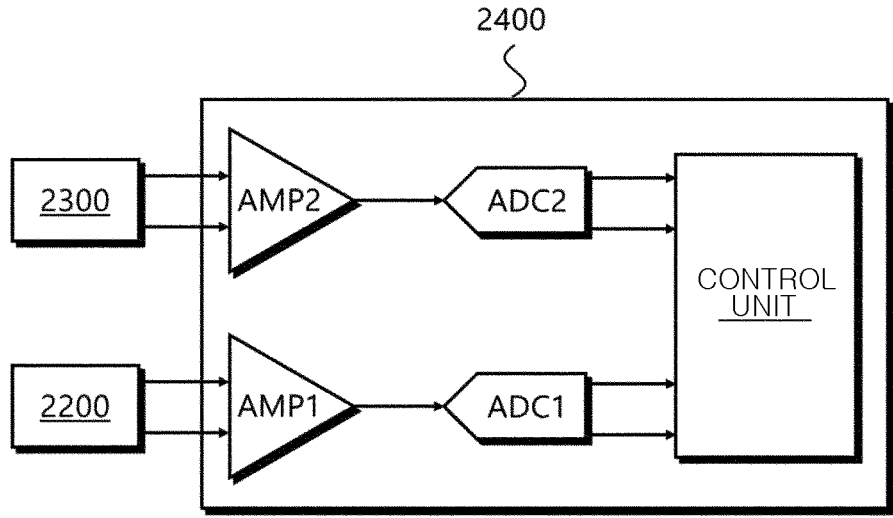
FIG. 16 is a view for describing the connection relationship of the sensor unit and a driving driver according to the embodiment of the present invention.

FIG. 16 is a view for describing the connection relationship of the sensor unit and a driving driver according to the embodiment of the present invention.

Referring to FIG. 16, the driving driver 2400 according to the embodiment of the present invention may include an amplification unit and an analog-to-digital convert (ADC) unit corresponding to each of the first sensor unit 2200 and the second sensor unit 2300.

Specifically, the driving driver 2400 may include a first amplification unit AMP1 and a first ADC unit ADC1 corresponding to the first sensor unit 2200. The first sensor unit 2200 may include two output terminals, and the two output terminals of the first sensor unit 2200 may be respectively connected to an inverting input terminal and a non-inverting input terminal of the first amplification unit AMP1. The output terminal of the first amplification unit AMP1 may be connected to an input terminal of the first ADC unit ADC1. The output terminal of the first amplification unit AMP1 may transmit an amplified first sensing signal to the first ADC unit ADC1. In addition, the two output terminals of the first ADC unit ADC1 are connected to a control unit to transmit the amplified first sensing signal converted into a digital signal.

In addition, the driving driver 2400 may include a second amplification unit AMP2 and a second ADC unit ADC2 corresponding to the second sensor unit 2300. The second sensor unit 2300 may include two output terminals, and the two output terminals of the second sensor unit 2300 may be respectively connected to the inverting input terminal and the non-inverting input terminal of the second amplification unit AMP2. The output terminal of the second amplification unit AMP2 may be connected to the input terminal of the second ADC unit ADC2. The output terminal of the second amplification unit AMP2 may transmit the amplified second sensing signal to the second ADC unit ADC2. In addition, the two output terminals of the second ADC unit ADC2 are connected to a control unit to transmit the amplified second sensing signal converted into a digital signal.

The control unit may generate a final sensing signal using the first sensing signal converted into the digital signal and the second sensing signal converted into the digital signal. Since the control unit generates the final sensing signal using the first sensing signal and the second sensing signal, the final sensing signal may have a higher number of ADC bits than the first sensing signal and the second sensing signal. For example, when the first ADC unit and the second ADC unit output the first sensing signal and the second sensing signal, respectively, as a 10-bit digital signal, the control unit may generate the final sensing signal as an 11-bit digital signal. Therefore, it is possible to increase sensing resolution.

Figure 17:
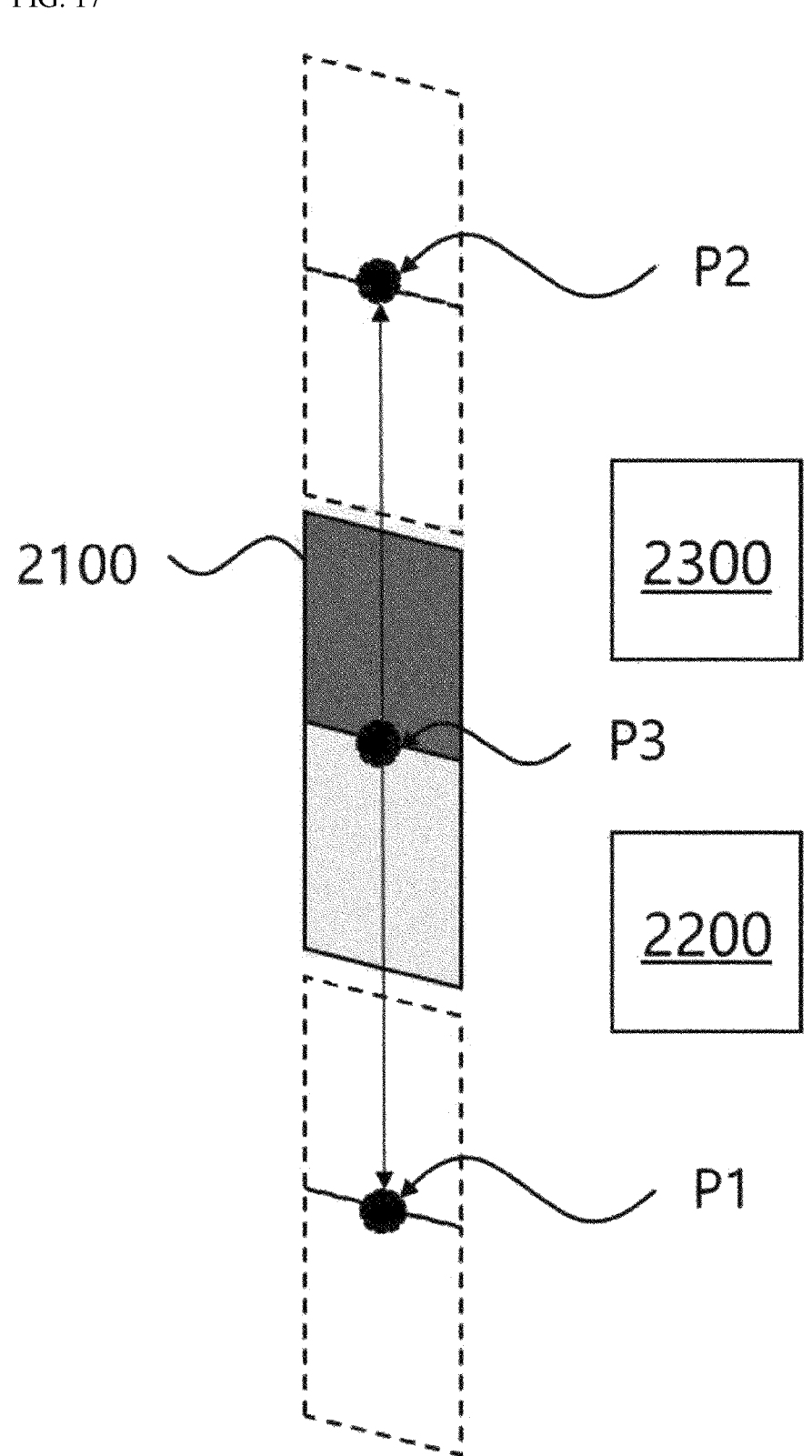
FIG. 17 is a view for describing a calibration process of the sensor unit according to the embodiment of the present invention.

FIG. 17 is a view for describing a calibration process of the sensor unit according to the embodiment of the present invention.

Although the first sensor unit 2200 and the second sensor unit 2300 is controlled to be disposed at preset positions when the camera module is manufactured, the arrangement of the first sensor unit 2200 and the second sensor unit 2300 may differ from the preset positions in the manufacturing process. In addition, process errors may occur in manufacturing the first sensor unit 2200 and the second sensor unit 2300. When such an error problem is not solved, errors may occur in measuring the position of the magnet 2100.

In order to solve the above problem, the driving driver 2400 according to the embodiment of the present invention may calibrate the first sensor unit 2200 and the second sensor unit 2300.

According to one embodiment, the driving driver 2400 may calibrate the first sensor unit 2200 to sense the first region based on a first sensing value and a second sensing value. Here, the first sensing value may be a sensing value measured from the first sensor unit 2200 when the magnet 2100 is positioned at the first point P1. The second sensing value may be a sensing value measured from the first sensor unit 2200 when the magnet 2100 is positioned at the third point P3. The third point P3 may be a center point between the first point P1 and the second point P2.

In addition, the driving driver 2400 may set a first gain value based on the first sensing value and the second sensing value. Here, the first gain value may be a gain value of the first amplification unit for receiving and amplifying the first sensing signal. The first gain value may be set according to the relationship with a second gain value. In one embodiment, the driving driver 2400 may set the first gain value so that a slope of the first sensing signal amplified according to the first gain value is the same as a slope of the second sensing signal amplified according to the second gain value.

According to one embodiment, the driving driver 2400 may calibrate the second sensor unit 2300 to sense the second region based on a third sensing value and a fourth sensing value. Here, the third sensing value may be a sensing value measured from the second sensor unit 2300 when the magnet 2100 is positioned at the second point P2. The fourth sensing value may be a sensing value measured from the second sensor unit 2300 when the magnet 2100 is positioned at the third point P3. The third point P3 may be a center point between the first point P1 and the second point P2.

In addition, the driving driver 2400 may set the second gain value based on the third sensing value and the fourth sensing value. Here, the second gain value may be a gain value of the second amplification unit for receiving and amplifying the second sensing signal. The second gain value may be set according to the relationship with the first gain value. In one embodiment, the driving driver 2400 may set the second gain value so that the slope of the second sensing signal amplified according to the second gain value is the same as the slope of the first sensing signal amplified according to the first gain value.

Meanwhile, in order to obtain the first sensing value and the third sensing value, the magnet 2100 may be controlled to be positioned at the first point P1 by not applying a current to the coil corresponding to the magnet 2100. In addition, the magnet 2100 may be controlled to be positioned at the second point P2 by applying a maximum current to the coil corresponding to the magnet 2100. However, it may be difficult to accurately control the current supplied to the coil so that the magnet 2100 is positioned at the center point between the first point P1 and the third point P3. Therefore, according to the present invention, the magnet 2100 may be controlled to be positioned at the third point P3 by making a predetermined corrected magnet 2100 close to the third point P3 or the magnet 2100 may be controlled to be positioned at the third point P3 using a separate correction tool such as a jig.

Although embodiments have been mainly described above, these are only illustrative and do not limit the present invention, and those skilled in the art to which the present invention pertains can know that various modifications and applications not exemplified above are possible without departing from the essential characteristics of the embodiments. For example, each component specifically illustrated in the embodiments may be implemented by modification. In addition, differences related to these modifications and applications should be construed as being included in the scope of the present invention defined in the appended claims.

The invention claimed is:

1. A camera module comprising:
a magnet disposed on a mover configured to move at least one lens;
a first sensor unit and a second sensor sense a position of the magnet along a first direction; and
a driving driver configured to receive a first sensing signal of the first sensor unit and a second sensing signal of the second sensor unit,
wherein the first sensor unit senses the position of the magnet corresponding to a first region among moving regions of the mover,
wherein the second sensor unit senses the position of the magnet corresponding to a second region among the moving regions,
wherein the first region and the second region are arranged in the first direction,
wherein a first output of the first sensor unit and a second output of the second sensor unit are connected to the driving driver, and the first output and the second output are not connected to each other, and
wherein the driving driver includes:
a first amplification unit electrically connected to the first sensor unit via the first output and configured to amplify the first sensing signal based on a first gain value; and
a second amplification unit electrically connected to the second sensor unit via the second output and configured to amplify the second sensing signal based on a second gain value.

2. The camera module of claim 1, wherein the magnet is coupled to the mover to linearly move between a first point closest to an image side and a second point closest to an object side.

3. The camera module of claim 2, wherein the first sensor unit is disposed to correspond to a position between the first point and a third point between the first point and the second point.

4. The camera module of claim 2, wherein the second sensor unit is disposed to correspond to a position between the second point and a third point between the first point and the second point.

5. The camera module of claim 2, wherein the first sensor unit is disposed to be spaced a predetermined distance from the second sensor unit in a moving direction of the mover, and the predetermined distance is smaller than a length of the first sensor unit in the moving direction of the mover.

6. The camera module of claim 1, wherein the first region and the second region do not overlap each other.

7. The camera module of claim 2, wherein the driving driver calibrates the first sensor unit to sense the first region based on a first sensing value sensed by the first sensor unit when the magnet is positioned at the first point and a second sensing value sensed by the first sensor unit when the magnet is positioned at a third point between the first point and the second point.

8. The camera module of claim 7, wherein the driving driver includes:
a first analog-to-digital convert (ADC) unit configured to receive the amplified first sensing signal and convert the received first sensing signal into a digital signal, and
the first gain value is set based on the first sensing value and the second sensing value.

9. The camera module of claim 2, wherein the driving driver calibrates the second sensor unit to sense the second region based on a third sensing value sensed by the second sensor unit when the magnet is positioned at the second point and a fourth sensing value sensed by the second sensor unit when the magnet is positioned at a third point between the first point and the second point.

10. The camera module of claim 9, wherein
the driving driver includes a second analog-to-digital convert (ADC) unit configured to receive the amplified second sensing signal and convert the received second sensing signal into a digital signal, and
the second gain value is set based on the third sensing value and the fourth sensing value.

11. The camera module of claim 1, wherein the driving driver generates a final sensing signal based on the first sensing signal and the second sensing signal.

12. The camera module of claim 6, wherein the first region is a region between the first point and a third point, and the third point is a center point of the first point and the second point.

13. The camera module of claim 12, wherein the second region is a region between the second point and the third point.

14. The camera module of claim 2, wherein the first sensor unit and the second sensor unit are disposed side by side to correspond to the first region and the second region, respectively, in a moving direction of the magnet.

15. The camera module of claim 5, wherein the predetermined distance is smaller than a length of the second sensor unit in the moving direction of the mover.

16. The camera module of claim 1, wherein the first output of the first sensor unit includes two output terminals.

17. The camera module of claim 16, wherein the two output terminals of the first sensor unit are respectively connected to an inverting input terminal and a non-inverting input terminal of the first amplification unit.

18. The camera module of claim 1, wherein the second output of the second sensor unit includes two output terminals.

19. The camera module of claim 18, wherein the two output terminals of the second sensor unit are respectively connected to an inverting input terminal and a non-inverting input terminal of the second amplification unit.

20. The camera module of claim 17, wherein an output terminal of the first amplification unit is connected to an input terminal of the first ADC unit, and the output terminal of the first amplification unit transmits the amplified first sensing signal to the first ADC unit.

* * * * *